(12) United States Patent
Tattenbaum et al.

(10) Patent No.: US 9,747,557 B2
(45) Date of Patent: Aug. 29, 2017

(54) TICKETING SYSTEMS AND METHODS INCORPORATING INTERACTIVE SEATING CHARTS

(71) Applicant: The Shubert Organization, Inc., New York, NY (US)

(72) Inventors: Jennifer Tattenbaum, Brooklyn, NY (US); David Andrews, Little Silver, NJ (US); Richard Miglin, Kinnelon, NJ (US); Robert O'Connor, Harwinton, CT (US)

(73) Assignee: THE SHUBERT ORGANIZATION, INC., New York, NY (US)

( * ) Notice: Subject to any disclaimer, the term of this patent is extended or adjusted under 35 U.S.C. 154(b) by 496 days.

(21) Appl. No.: 13/720,477

(22) Filed: Dec. 19, 2012

(65) Prior Publication Data

US 2013/0159030 A1    Jun. 20, 2013

Related U.S. Application Data

(60) Provisional application No. 61/577,459, filed on Dec. 19, 2011.

(51) Int. Cl.
*G06T 15/10* (2011.01)
*G06Q 10/02* (2012.01)
*G07B 5/00* (2006.01)

(52) U.S. Cl.
CPC .............. *G06Q 10/02* (2013.01); *G07B 5/00* (2013.01)

(58) Field of Classification Search
CPC ................................ G06Q 10/02; G06T 15/10
USPC .... 705/5, 1.1, 7.11, 27.2; 707/E17.014, 706, 707/E17.108, 769, 804, 805; 345/419, 345/619; 700/17, 118, 203, 285; 715/214
See application file for complete search history.

(56) References Cited

U.S. PATENT DOCUMENTS 6,434,536 B1    8/2002  Geiger
7,454,361 B1    11/2008 Halavais
(Continued)

OTHER PUBLICATIONS

ETM and ICON Create New Venture That Will Revolutionize How Consumers Buy Movie Tickets; Mar. 8, 1999; Copyright 1999, PR Newswire; Last Accessed at http://www.gokis.net/self-service/newsbits/newsbits/1999/nb030999a.htm, on Feb. 3, 2014.

*Primary Examiner* — Akiba Allen
(74) *Attorney, Agent, or Firm* — Troutman Sanders LLP

(57) ABSTRACT

Ticketing systems and methods, as well as related computer product programs, provide efficient and user-friendly seat selection by incorporating realistic seating charts. An advantageous ticketing system may include data related to a physical layout of a venue. The ticketing system may generate a three-dimensional model of the venue, from which one or more seating charts may in turn be generated. A user may search the ticketing system for seats based on customized user search parameters, which may include searching across multiple performances. In response to the user search, the ticketing system may provide an interactive three-dimensional seating chart depicting a relatively accurate seat layout based on the venue data. The user may manipulate the seating chart to view the venue from various perspectives, and the user may select seats from the seating chart. Other embodiments of the ticketing system are also disclosed herein.

30 Claims, 7 Drawing Sheets

(56) References Cited

U.S. PATENT DOCUMENTS

| | | |
|---|---|---|
| 7,548,866 B2 | 6/2009 | Halavais |
| 7,548,867 B2 | 6/2009 | Halavais |
| 7,548,868 B2 | 6/2009 | Halavais |
| 7,548,869 B2 | 6/2009 | Halavais |
| 7,548,870 B2 | 6/2009 | Halavais |
| 7,640,178 B2 | 12/2009 | Halavais |
| 7,657,449 B2 | 2/2010 | Halavais |
| 7,660,727 B2 | 2/2010 | Halavais |
| 7,660,728 B2 | 2/2010 | Halavais |
| 7,660,729 B2 | 2/2010 | Halavais |
| 7,664,663 B2 | 2/2010 | Halavais |
| 7,685,009 B2 | 3/2010 | Halavais |
| 7,962,367 B1 | 6/2011 | Fuisz |
| 8,255,279 B2 | 8/2012 | Fuisz |
| 2002/0004753 A1* | 1/2002 | Perkowski ............... 705/26 |
| 2007/0265892 A1* | 11/2007 | Valentino ............... 705/5 |
| 2008/0255889 A1* | 10/2008 | Geisler et al. ............... 705/5 |
| 2009/0228830 A1* | 9/2009 | Herz et al. ............... 715/808 |
| 2011/0191688 A1* | 8/2011 | Hasegawa et al. ............... 715/738 |

\* cited by examiner

TICKETING SYSTEMS AND METHODS INCORPORATING INTERACTIVE SEATING CHARTS

CROSS-REFERENCE TO RELATED APPLICATIONS

This application claims a benefit, under 35 U.S.C. §119 (e), of U.S. Provisional Application Ser. No. 61/577,459, filed 19 Dec. 2011, the entire contents and substance of which are hereby incorporated by reference.

FIELD OF THE INVENTION

The invention relates to electronic ticket sales and, in connection therewith, to the provision and use of interactive seating charts to facilitate electronic ticket sales.

BACKGROUND OF THE INVENTION

Although personal sales used to be the norm for ticketing, that is no longer the case. A large portion of event-goers now purchase tickets through ticketing websites. A difficulty with these purchases is the characteristic limitation on a user's ability to determine and select the quality and location of individual seats. Some conventional ticketing websites provide seating charts, but conventional seating charts still fail to provide important information that may be relevant to decision-making. For example, seating charts fail to provide users with a full picture of the quality and location of their seats relative to other sites in the event venue.

OBJECTS OF THE INVENTION

It is an object of the invention to provide a robust system for investigating the characteristics and availability of event tickets, as well as for purchasing tickets.

It is another object to provide a system that furnishes such features as detailed and realistic seating charts, ticket bookmarking, price-based searching, seat comparison, searching across multiple performances, or a combination of one or more of these to a potential customer.

It is a further object to provide the aforementioned robust system having one or more of such features in a manner that affords access to remote users, for instance, to members of the public at off-site locations.

It is yet another object to provide methods and computer product programs for implementing the foregoing.

SUMMARY OF THE INVENTION

Briefly described, a ticketing system may include at least one database, a search unit, and a charting unit. A transaction unit is preferably, but not essentially, incorporated. The system is advantageously, though not necessarily, adopted for on-line ticketing operations, and may involve a web-based application accessible from a remote location via another's computer. It goes almost without saying that the inventive method and computer product program comprise, respectively, steps and commands whereby functions corresponding to the foregoing system components are implemented.

The database may store and afford access to, and may otherwise maintain (such as by organizing) information relating to one or more events, one or more event venues, and seating therefor. In certain highly advantageous embodiments venue information may pertain to physical layout of the venue in three dimensions. For example, and not limitation, this may include a blueprint or other structural map. Each performance of an event may be associated with a particular venue and with seating information, such as information concerning price, location and availability. The database may also maintain records of seats, performances, events, or venues that are bookmarked or on hold by users.

The search unit may provide robust searching functionality for the ticketing system. In various good embodiments, this is carried out so as to yield information in real or nearly real time. For example, the search unit may receive one or more parameters from a user, and based on the parameters, the search unit may identify performances, events, or venues, and seating (such as availability) therefor, which are of potential interest to the user. Searching may be provided by price or across multiple performances, or in respect of one or more other parameters.

The charting unit may receive information related to performances, venues, and seating from the database. Based on the venue information, the charting unit may provide a two- or three-dimensional model of the venue's seats, translatable into two-dimensional or three-dimensional seating charts from a customized viewpoint. In various good embodiments, a seating chart is interactive, and the ticketing system enables a user to select seats through a website. When one or more seats are selected, the ticketing system may display details about the seats or enable the user to purchase tickets for the seats. In some of those embodiments, the charting unit also renders a view of the stage from the viewpoint of the selected seats, based on the venue information.

The transaction unit may facilitate financial transactions related to events. After seats are selected by a user, the transaction unit may provide a shopping cart and various forms for the user to fill out to provide payment. During the checkout process, the user's seats may remain on hold and may therefore appear as unavailable to other users concurrently accessing the ticketing system. The transaction unit may accept various forms of payment, including, for example, credit card or electronic check. In some advantageous embodiments, the transaction unit communicates with a third-party financial institution to verify payment. After payment is received, the transaction unit may transmit confirmation to the user.

Accordingly, in one aspect, the invention is in a system comprising a database for maintaining event information, venue information, and seating information, the venue information concerning a physical layout of a seating area of the venue; a charting unit configured to calculate a venue model based on the venue information; a search unit configured to search the database based on one or more user-provided search parameters and to return seat availability information and a seating chart, based on the search parameters and the venue model, the seating chart being dynamically updateable based on user interactions.

In another aspect, the invention is in a method comprising accessing first venue information relating to a physical layout of a first venue hosting a first performance; accessing first seating information including information relating to seat availability for the first performance; receiving a first search request comprising one or more search parameters; searching the first seating information to identify one or more available seats for the first performance; generating, with a computer processor, a first seating chart based on the venue information, the seating chart being a three-dimensional model of the first venue in which locations of a plurality of seats and a distance between a plurality of rows are based on one or more measurements in the first venue information; highlighting one or more seats on the seating chart corresponding to the first search request; and transmitting the first seating chart to a client instrumentality in response to the first search request.

And, in a further aspect, the invention is in a computer program product embodied in a non-transitory computer-readable medium having computer-readable instructions stored thereon for execution by a processor to perform a method for ticketing, such method comprising accessing venue information related to a physical layout of a venue hosting a performance, accessing seating information including information relating to seat availability for the performance; receiving a view seats request for the performance; generating, with a computer processor, a seating chart based on the venue information, the seating chart being a three-dimensional model of the venue in which locations of a plurality of seats and a distance between a plurality of rows are based on one or more measurements in the venue information; and transmitting the seating chart to a client in response to the view seats request.

These and other objects, features and advantages of the ticketing system, methods and programs of the invention will be elucidated in the following further description including accompanying drawing figures.

DETAILED DESCRIPTION OF CERTAIN PREFERRED EMBODIMENTS

Figure 1:
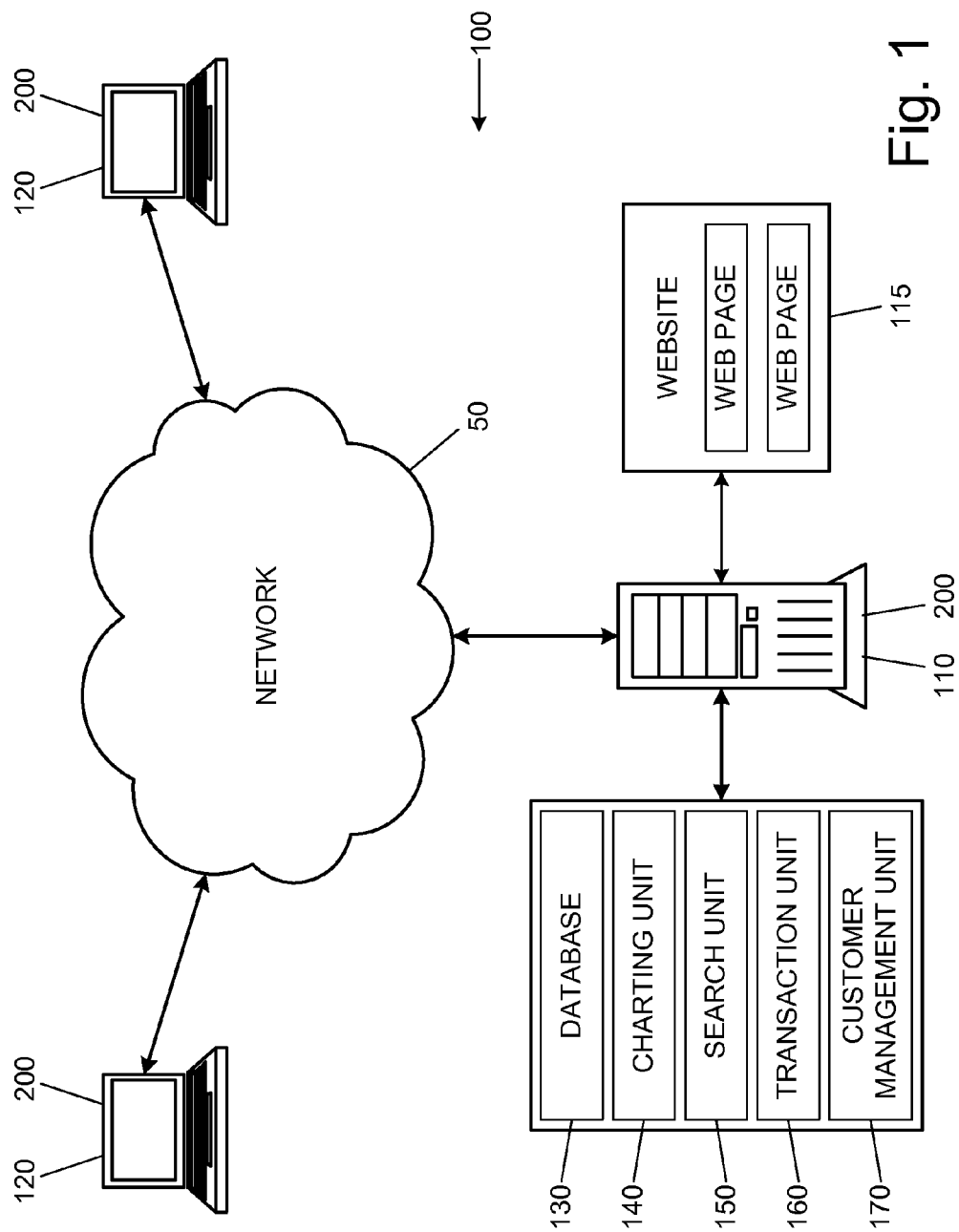
FIG. 1 is a schematic diagram of a ticketing system and operational characteristics thereof, according to an embodiment of the present invention.

To facilitate an understanding of the principles and features of the invention, various illustrative embodiments are explained hereinafter. Although certain examples of the invention are explained in detail, other embodiments are contemplated. Further, in describing the illustrative embodiments, specific terminology will be resorted to for the sake of clarity. It is not intended that the invention is limited in its scope to the details of construction and arrangement of components set forth in the following description or illustrated in the drawings. The invention has other embodiments and can be practiced or carried out in various other ways as will be understood by one of ordinary skill in the art once in possession of the subject matter herein.

The materials and components described as making up the various elements of the invention are intended to be illustrative and not restrictive. Many suitable materials and components that would perform the same or a similar function as the materials and components described herein are intended to be embraced within the scope of the invention. Such other materials and components not described herein can include, but are not limited to, for example, those developed after making of the invention.

More specific embodiments of the present invention, in the nature of ticketing systems methods and computer program products, are now described for the purpose of providing users with detailed information about performance seats to enable informed decisions about purchasing from currently available inventory. With reference to the figures, in which like reference numerals represent like items throughout the views, various embodiment of the invention will be described in detail.

FIG. 1 includes a depiction of ticketing system 100. The system is robust and features a variety of functions relevant to events and ticketing. Operation of ticketing system 100 permits a user to view or purchase seats for an performance, from a remote location via the internet or other suitable means of communication, and thus illustrates corresponding steps of the inventive method as well as commands of a computer program product. To this end, ticketing system 100 performs one or more of the following functions: present information about a plurality of upcoming performances; enable selection of at least one performance for possible attendance; search for available seats across one or more performances; provide a seating chart of a selected performance with seating information including current availability; enable selection of one or more seats from the seating chart; save (i.e., hold) the selected seat(s) for possible future purchase; remove the saved seat(s) from the inventory of currently available seating to prevent another person from purchasing same; enable purchase of the selected seats; transmit electronic communications to customers regarding seat selections or purchases; and provide the purchaser with the option of receiving electronic ticketing.

As shown in FIG. 1, ticketing system 100 utilizes a client-server architecture, in which one or more aspects of ticketing system 100 reside within or are otherwise in communication with at least one server 110. Customers access the ticketing system from a plurality of client instrumentalities 120 remote from the server 110. Each client instrumentality 120 can comprise software, hardware, or a combination of both. For example, a client device 120 may be a computing device 200 (see FIG. 2), or a client device 120 may be a process or application running on a computing device 200. In some embodiments, a client device 120 may access functionality of the ticketing system 100 through a website 115 supported by the server 110.

Ticketing system 100 comprises at least one database 130, a charting unit 140, a search unit 150, and a transaction unit 160. Generally, database 130 holds information for the ticketing in accessible format by the various other units; search unit 150 searches the database to identify performances, events, venues, or seats meeting a user's search criteria; charting unit 140 renders seating charts for performance, event, venue, or seat exploration; and transaction unit 160 facilitates ticket purchases.

Each of these components of ticketing system 100 can comprise hardware, software, or a combination of both. Although these components may be described herein as being distinct units, this distinction is provided for illustrative purposes only and should not be deemed to limit the various embodiments of the invention. Rather, these components may be combined for dual-use applications, or be overlapping or divided in other ways.

A. CLIENT-SERVER ARCHITECTURE

The overall architecture of ticketing system 100 can be a client-server architecture, as in FIG. 1, in which various operations of the ticketing system may be performed by at least one server 110. Each customer using ticketing system 100 accesses it via a client device 120 to access the ticketing system by communicating with the server. As indicated previously herein, client instrumentality 120 can comprise software, hardware, or a combination of both, and may be a computing device, or a process or application running on a computing device.

In some embodiments, ticketing system 100 involves duplex communication between client instrumentality(ies) 120 and server 110. For instance, a client device 120 may utilize Microsoft® Internet Information Services (IIS) version 7 or higher, SQL Server 2008 or higher, .Net 3.5 (including the Windows Communication Foundation), a replication agent capable of replicating data from Informix 10.7 or higher to an SQL Server, and a Silverlight-enabled development environment, including a three-dimensional rendering toolset compatible with the Microsoft classes deployed in Silverlight applications. The Silverlight application may be a client application embedded in one or more web pages of the website 115, and may dynamically update the content of a web page as needed. Alternatively, various other graphics rendering technologies may be used in place of, or in addition to, Silverlight. Client-side JavaScript (AJAX) may be a primary method for communicating data on the client side.

This design may reduce or minimize traffic between client instrumentalities 120 and server 110, as compared with various other possible implementations that are also within the scope of the present invention.

Various embodiments of the ticketing system 100 may be embodied in one or more transitory or non-transitory computer readable media for execution by a processor. An example embodiment may be provided by or to an application or web browser of a computing device, such as a server, smartphone, tablet, portable computer, tablet PC, Internet tablet, PDA, ultra mobile PC (UMPC) or smartphone.

Figure 2:
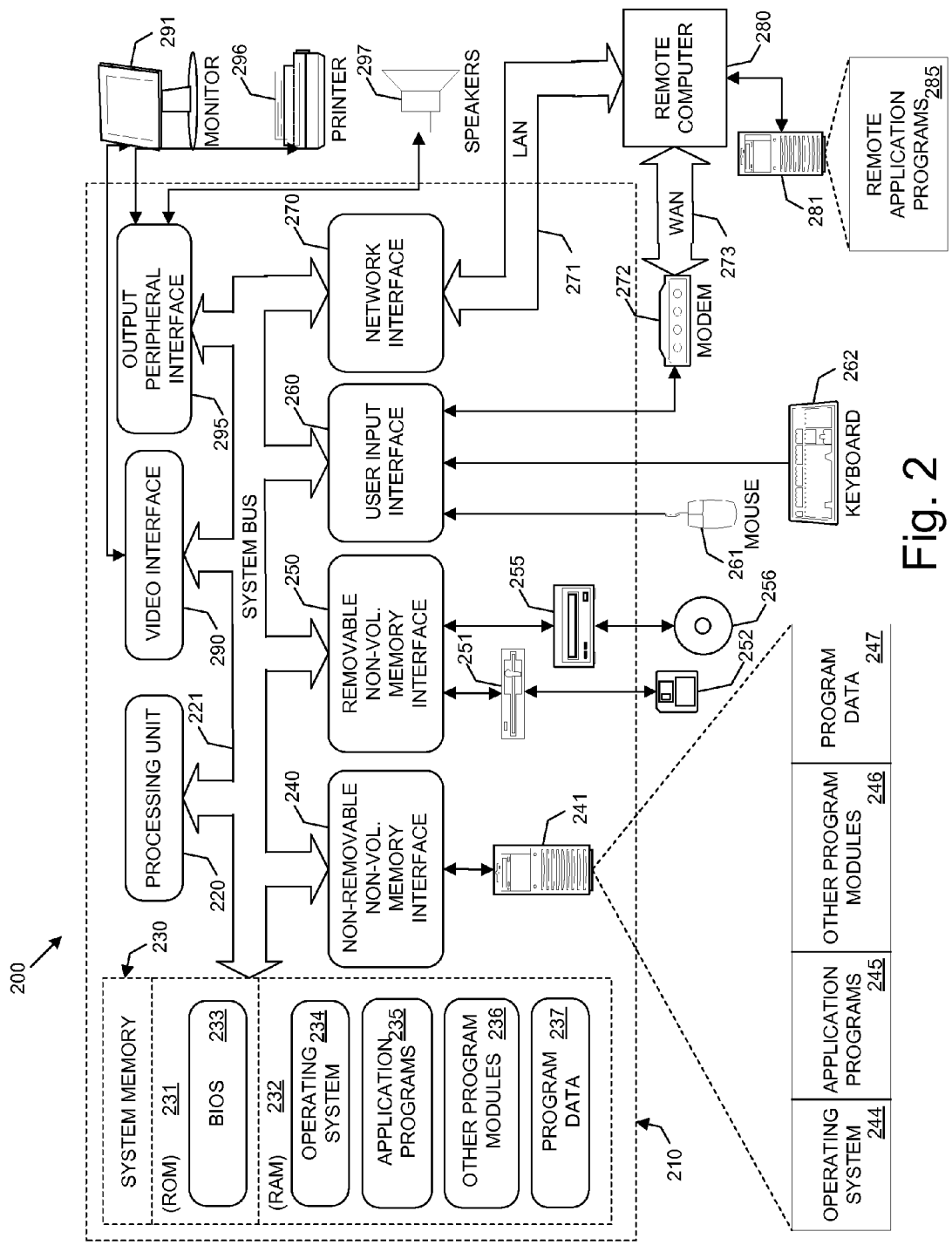
FIG. 2 schematically illustrates the architecture of a computing device useable as a server for, or a client instrumentality by which a member of the public can access, the ticketing system, according to an embodiment of the present invention.

For instance, FIG. 2 is a depiction of the architecture of a computing device useable as a server 110 or a client instrumentality 120 of ticketing system 100, according to an exemplifying embodiment of the present invention. One or more aspects of the invention, such as ticketing system 100 or a related method may reside, in whole or in part, in—or the functioning of—a computing device 200 or the invention's interfacing with such computer device. For example, server 110 or client instrumentality 120 may reside in a computing device 200. Thus, embodiments of the ticketing system 100 can sometimes be described in terms of computer-executable instructions, such as one or more applications or program modules, stored on a computer-readable medium and executed by a computer processing unit.

Although specific components of a computing device 200 are illustrated in FIG. 2, the depiction of these components as opposed to others does not limit the scope of the invention. Rather, various types of suitable computing devices 200 can be used to implement embodiments of the invention. Accordingly, embodiments of the invention may be operational with numerous other general purpose or special purpose computing system environments or configurations.

With reference to FIG. 2, components of computing device 200 comprise, without limitation, a processing unit 220 and a system memory 230. A system bus 221 couples various system components including system memory 230 to processing unit 220.

Computing device 200 can include a variety of computer readable media. Computer-readable media may be various available media that are accessible by the computing device 200, including both volatile and nonvolatile, removable and non-removable media.

System memory 230 can comprise computer storage media in the form of volatile or nonvolatile memory such as read only memory (ROM) 231 and random access memory (RAM) 232. A basic input/output system 233 (BIOS), containing routines that help to transfer information between elements within the computing device 200, such as during start-up, may typically be stored in the ROM 231. RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable or non-removable, volatile or nonvolatile computer storage media. By way of example only, FIG. 2 illustrates a hard disk drive 241 that may read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other computer storage media that can be used as desired in the exemplified operating environment include magnetic tape cassettes, flash memory cards, digital versatile disks, digital video tape, solid state RAM, solid state ROM, and the like. The hard disk drive 241 is connected to the system bus 221 through a non-removable memory interface such as interface 240, with magnetic disk drive 251 and optical disk drive 255 typically being connected to the system bus 221 by a removable memory interface, such as interface 250.

The drives and their associated computer storage media discussed in the preceding passages and illustrated in FIG. 2 may provide storage of computer readable instructions, data structures, program modules and other data for the computing device 200. For example, hard disk drive 241 is illustrated as storing an operating system 244, application programs 245, other program modules 246, and program data 247. These components may either be the same as or different from operating system 234, application programs 235, other program modules 236, and program data 237.

A web browser application program, or web client, instrumentality 235 may be stored on the hard disk drive 241 or other storage media. Web client instrumentality 235 may request and render web pages, such as those written in Hypertext Markup Language ("HTML"), in another markup language, or in a scripting language. For example, if the computing device 200 is used as client device 120 of the ticketing system 100, the rendered web pages may include pages of the ticketing website 115.

A user of computing device 200 enters commands and information into computing device 200 through input devices such as a keyboard 262 and pointing device 261, commonly referred to as a mouse, trackball, or touch pad. Other input devices (not shown for the sake of simplicity and clarity) may include a microphone, joystick, game pad, satellite dish, scanner, electronic white board, or the like.

These and other input devices are often connected to the processing unit 220 through a user input interface 260 coupled to system bus 221, but may be connected by other interface and bus structures, such as a parallel port, game port, or a universal serial bus (USB). A monitor 291 or other type of display device may also be connected to system bus 221 via an interface, such as video interface 290. In addition to the monitor, computing device 200 may also include other peripheral output devices such as speakers 297 and a printer 296. These may be connected through an output peripheral interface 295.

In various situations, different input devices may be used to achieve a comparable result. Thus, where this disclosure refers to a specific type of input device, i.e., a mouse, it will be understood that the related functionality of ticketing system 100 may likewise be initiated by additional or alternative input devices.

Computing device 200 can operate in a networked environment, being in communication with one or more remote computers 280 over a network 50. For example, and not limitation, each client instrumentality 120 may be in communication with server 110 over a network. Remote computer 280 may be a personal computer, a server, a router, a network PC, a peer device, or other common network node, and may include many or all of the elements described above relative to computing device 200.

In addition to the components of ticketing system 100 mentioned above, the ticketing system may also comprise a messaging unit 170 for receiving and sending communications between various components, such as server 110, client devices 120, and database 130. The messaging unit may, for example, transmit web pages for website 115 from server 110 to a requesting client device 120 over network 50.

When used in a LAN environment, computing device 200 may be connected to LAN 271 through a network interface or adapter 270. When used in a WAN environment, computing device 200 may include a modem 272 or other means for establishing communications over WAN 273, such as the internet. Modem 272, which may be internal or external, may be connected to system bus 221 via the user input interface 260 or other appropriate mechanism. In a networked environment, program modules depicted relative to computing device 200 may be stored in the remote memory storage device. For example, and not limitation, FIG. 2 illustrates remote application programs 285 as residing on memory storage device 281. It will be appreciated that the network connections shown are exemplary and other means of establishing a communications link between the computers may be used.

B. DATABASE

Ticketing system 100 may be integrated with information relating to a plurality of customers, events, and venues, with database 130 being capable of storing and organizing data related to such customers, events, and venues, as well as seating information, including seat price, location and availability. Accordingly, the at least one database 130 may hold customer, event, venue, and seating information.

Throughout this disclosure, the term "performance" generally refers to a specific instance of an event occurring at a particular time and place. The term "event" generally refers to one or more similar performances occurring, or scheduled to occur, within a single venue and with a fixed seat layout within that venue. For example, and not limitation, a single occurrence of a play may be considered a performance, while the series of performances of that play within a specific venue may be considered an event. It will be understood that there may be some overlap in data associated with performances and events. Data related to a performance may also relate to its associated event, while data related an event may likewise relate to the event's associated performances.

Although the singular form "database" is used throughout this disclosure, it will be understood that one or multiple databases may be used. For example, and not limitation, the customer information may be stored in a customer database, the event information may be stored in an event database, the venue information may be stored in a venue database, and the seating information may be stored in a seat availability database.

The customer data may be tracked and managed by a customer management unit 170. The customer data may comprise data related to individuals and other entities using ticketing system 100 or registered with website 115 of ticketing system 100. This data may include, for example, a customer's payment information, mailing address, and performance, event, or venue preferences. A customer may be associated with a list of seats, performances, events, or venues, which the customer has bookmarked or for which the customer has registered for updates. A customer may additionally be associated with one or more special offers. In an exemplifying embodiment, these quanta of customer data are viewable and managed by the customer, such as through website 115. If a special offer associated with a customer is applicable to specific seats, performances, events, or venues, that offer may be displayed on a customer account page, or on various pages of website 115 related to the relevant seats, performances, events, or venues.

In some embodiments, ticketing system 100 may enable a customer to bookmark one or more seats, performances, events, or venues. The bookmarks can then be associated with the customer within the customer data. At a later time, the customer may use the bookmark to link to the seats, performances, events, or venues that were marked. The customer may thus use the bookmark to check the availability of seats previously marked and, if desired, to purchase the seats if they are available.

In certain desirable embodiments, the seating system from time to time may remove bookmarks and special offers from the customer data in database 130, so as to purge database 130 of customer information that is no longer applicable. After a performance has taken place for example, bookmarks related to that performance may be removed from ticketing system 100. Similarly, after a special offer expires, it may be removed from the customer data. This purge may be performed immediately after the performance or, in some embodiments, in a batch process on a periodic basis.

A customer may register to receive updates related to specific seats, performances, events, or venues, and that update request may also be stored in the customer data associated with that customer. Ticketing system 100 may transmit applicable updates to the customer, in some cases, in real time, based on changes to data in database 130 of ticketing system 100. For example, and not limitation, if a seat becomes available for a previously-filled performance, as to which seat a customer registered to receive updates, a notification of seat availability may be transmitted to an email address or telephone of the customer in real time when the seat becomes available.

Typically, a performance is an occasion or other gathering at which a specific instance of an event takes place, and for which a ticket or entry pass is issued, or for which entry is otherwise limited. Because the definitions of performance and event are closely related, it will be understood that these two terms may oftentimes be used interchangeably.

For each event handled through ticketing system 100, the event information may include dates and times of each performance, a venue at which the event is to be held, and associated seating information indicating pricing and availability. If the venue requires a special lay-out for the event or for a specific performance, such as additional seats or a modified stage, then the event information may reflect the same.

For each event, database 130 may maintain data indicating the status of some or all seats for each performance. The database may store information about which seats are available for sale, which seats are on hold, and which seats are bookmarked for updates. The identification of a seat for a particular event may vary based on the event or the venue in which it is held. For example, if an event is general admission only, then the seat availability data may be implemented to keep track of the number of available seats, or the general sections of the seats, instead of identifying the specific location of each available seat. In contrast, if an event requires specific, reserved seats, then database 130 may track the status of each individual seat in the venue.

In certain good embodiments, the seat availability data is stored in a dedicated database 130. This data is updated in real-time or nearly real-time based on data communicated to ticketing system 100, such as purchases and reservations made on website 115. For instance, real-time updates may have sub-second update times, and nearly real-time may allow a latency of approximately three to five seconds, preferably no more than five seconds.

In some embodiments, ticketing system 100 also includes a ticketing database distinct from the seating database. The ticketing database keeps track of tickets that have been sold, optionally including tickets sold at brick-and-mortar locations or over the telephone as well as via the internet. Ticket sales and availability may be transmitted, preferably in real-time as availability permits, from the ticketing database to the seat availability database. Such information may also be provided in other time frames and formats to marketers, producers, etc.

For the purposes of ticketing system 100, a venue may be an individual location in which one or more events occur. For example, a venue may be a theatre or stadium. The venue information associated with a particular venue may include, for example, name, address, identification and location of seat levels or sections, and venue type.

As discussed further hereinafter, ticketing system 100 can provide one or more models of a venue, and thus, the venue information may include information about the venue layout, with respect to the seats or the stage, to enable such modelling. For example, and not limitation, the venue information may include information for modelling within a section of seats, including, for example, distance between rows, aisle width, and seat width. The venue information may include information for modelling the overall venue layout, including, for example, data related to an overhang row, height of a level above the immediately lower level, floor rake, and the railing height. The venue information may also include information related to the stage, such as stage type, stage width, stage depth, proscenium arch, and other physical parameters that define the overall shape of the venue. Each seat in a venue may be identified by a specific seat number, which may also be stored in the venue information.

C. CHARTING UNIT

Ticketing system 100 can be designed to provide a seating chart when appropriate, which may be a functionality provided by the charting unit 140. A seating chart may be accessed by a remote user from various places within the website of ticketing system 100. For example, and not limitation, a user may access a seating chart when exploring a venue, checking seat availability for an event, obtaining show information, bookmarking seats or events, or finding or purchasing tickets.

Ticketing system 100 may provide one or more representations of seating charts for a performance. A first possible representation is a three-dimensional rendering 300 of the seats of the event venue (see FIG. 3 for example). A second representation is a two-dimensional rendering 400 (see FIGS. 4A-4B for example), in which all seats are depicted as circles or some other predetermined, standard shape. The seating chart rendering can be approximate, in that it need not be photo-realistic, but it may be designed to represent the actual venue while also, in some embodiments, including one or more stylistic elements unique to the provider of ticketing system 100. It can depict seat locations and physical structures, such as walls, floors, stage, or obstructions. After rendering, the seating chart can be transmitted over a network (such as the internet) to a client instrumentality 120 for display at the client instrumentality 120.

In some embodiments, some or all available seating chart representations are interactive in whole or in part. For example, a user may select seats or view information about seats by performing a mouse action, such as a single or double mouse click, over one or more seats of interest. In some embodiments, some seating chart representations may be interactive while others are not, or some representations may provide a greater level of interactivity than others. For example, and not limitation, the two-dimensional seating chart may be non-interactive, while the three-dimensional seating chart may be interactive. Alternatively, ticketing system 100 may enable rotations and other manipulations of the three-dimensional representation and not of the two-dimensional representation. A view from each selected seat to the stage is provided.

In some embodiments, a user is able to select between the available representations. In this case, the user's selection may be saved, for example, in the user's account or in a cookie on the user's client device 120. As a result, the user's selection may be applied and the preferred representation used across multiple visits of the user to website 115. In some other embodiments, however, the ticketing system 100 automatically selects a representation that is deemed appropriate. Appropriateness may be determined based on, for example, whether necessary software is present on client instrumentality 120 or based on the connection between the client instrumentality 120 and a web server for the website 115.

Website 115 may provide a seating chart in response to various actions performed by a website user. For example, as will be discussed further below, a seating chart may be provided in response to a search. The behaviour, or mode, of the seating chart may vary based on the context in which the seating chart is presented. Possible modes of the seating chart may include, for example, display venue mode, view seats mode, find tickets mode, navigation mode, and administrative mode. Seating chart interactivity and behaviour may differ across these modes.

A seating chart in display venue mode may be provided on website 115 when a user indicates a desire to view a seating chart, such as by clicking a seating chart tab or button, while viewing information about a particular event. Ticketing system 100 may then provide a seating chart to the user, and as discussed above, the seating chart may be a two-dimensional or a three-dimensional representation of the applicable venue's seat layout for the event.

In the display venue mode, the seating chart need not provide an ability to select seats, although it will be understood that such functionality would also be within the scope of the present invention. The seating chart may be enabled to display information as the user mouses-over or clicks various sections of seats. In some embodiments, this mode may restrict seat selection, but may enable the user to explore a venue. If the three-dimensional representation is used, the ability to view the stage from different locations in the venue may be activated.

The view seats mode may be accessed from various pages of website 115, including, for example, an order confirmation page or a user account page. This mode may be adapted to enable viewing of specific seats that the user has selected to purchase or has previously purchased. In the view seats mode, ticketing system 100 may receive indication of specific seats by reference or by selection, including a specific seating area, row, and range of seats. The available seats can appear highlighted in the seating chart, and in an exemplary embodiment, no other seats are highlighted or selectable. Highlighting is typically keyed to a desired parameter or parameters, such as availability or pricing, but this is not to exclude others as well or alternatively. The seating chart can be interactive, enabling the user to view the seats at various angles and to view the venue's focal area, or stage.

The find tickets mode may be the richest mode and may be applicable when the user searches for tickets for a single performance or a range of performances. This mode will be discussed further below, with respect to search functionality.

There are several places where a smaller-than-usual rendering of a seating chart may be used, having limited functionality in a navigation mode. Navigation mode may enable a user to view information about various areas of a venue, and to click on those areas to filter a ticket search according to selected sections.

Administrative mode may be available only to authenticated administrators of ticketing system 100. Administrative mode may enable full interactivity of the seating chart, so that an administrative user may manually change prices or statuses of seats. In some embodiments, this mode may also enable an administrator to manually modify other seat availability information as needed. An administrator may also be able to modify the layout of a venue, such as information related to: height of each seating level, type of row curvature type (e.g., straight, elliptical, or horseshoe shape), stage type (e.g., thrust, proscenium, small thrust, or stadium), placement of seating sections and aisles, box seating characteristics, orchestra pit characteristics, seating style (e.g., auditorium, cabaret, or benches), or other aspects of the venue layout.

Charting unit 140 can be designed to provide a realistic yet approximate visualization of a venue, from object coordinates provided in the venue information in database 130. In some embodiments, ticketing system 100 may pre-generate a model of a venue, along with one or more seating charts, to enable efficient provision of a seating chart to a user when appropriate. It will be understood that, although charting unit 140 could alternatively be adapted to perform all modelling calculations at the time a seating chart is requested by a user. Either way, exemplarily, ticketing system 100 may generate seating charts dynamically and in real or nearly real time upon request.

For example, a two-dimensional seating chart may be pre-calculated and stored. This chart may be transmitted to client instrumentality 120 without additional calculations, except to highlight specific seats such as are available currently for sale (as applicable). It would likely be unreasonable to store all viewpoints and perspectives of a three-dimensional seating chart. Thus, a three-dimensional chart may be rendered dynamically based on a pre-generated model. As a result, users may gain an accurate view of the event venue in real-time to enable efficient selection and purchase of tickets.

Efficient calculations for seating charts, particularly three-dimensional seating charts, can be facilitated by basing the calculations on information related to standard theatre or other venue layouts. Charting unit 140 may perform calculations based on those discussed below, to model and chart a venue.

The rake of a level inside a theatre, or other venue, is defined as the angle of the floor on which the seats are mounted. Venues are typically raked to provide more seats within a given amount of space, with a view toward enhancing the customer experience. In an exemplary embodiment, charting unit 140 may perform a rake calculation based on one of two different construction types: straight rake and curved rake.

Figure 5:
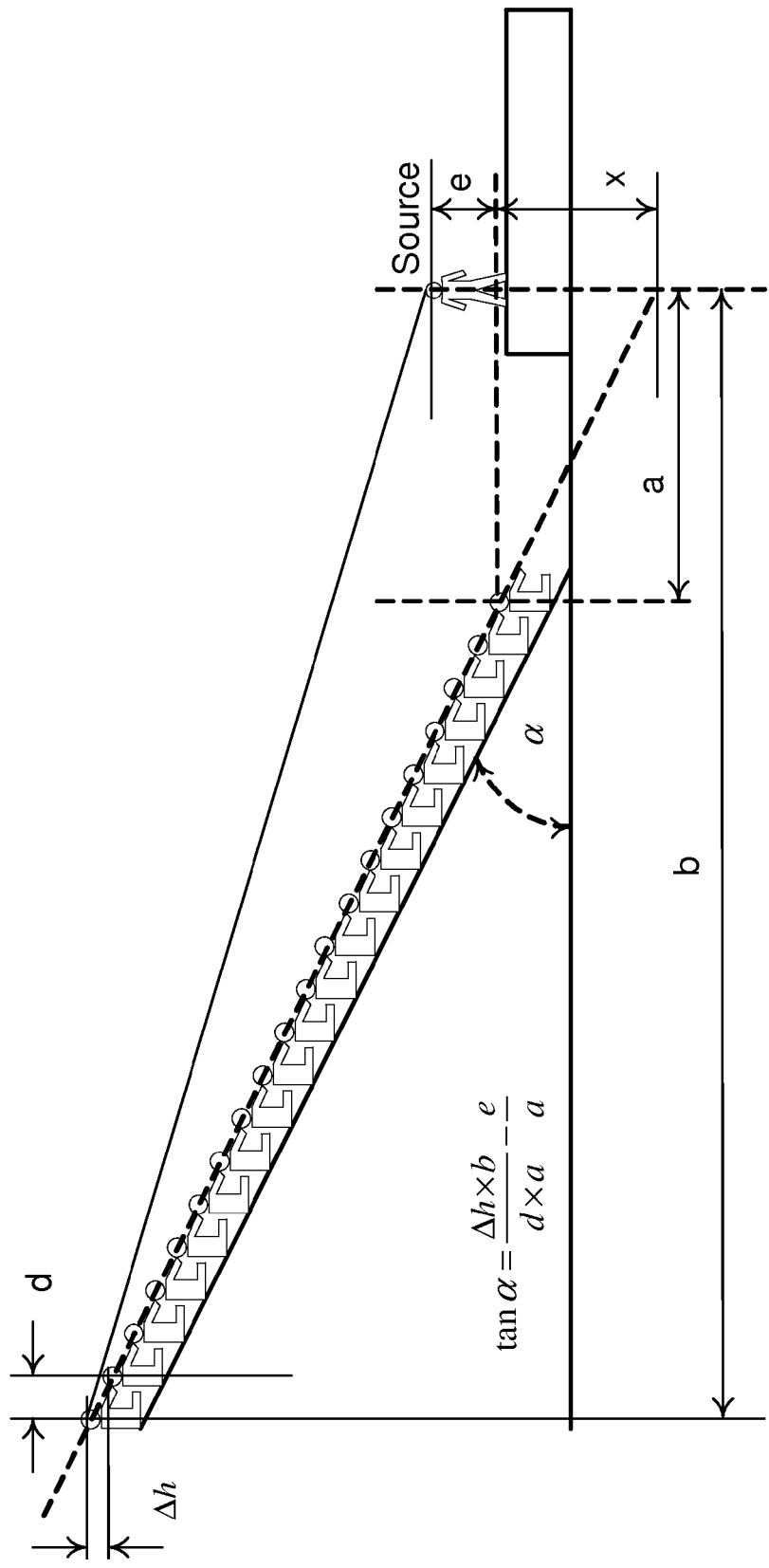
FIG. 5 illustrates parameters for calculating a model of a venue having a straight rake, according to an exemplary embodiment of the present invention.

FIG. 5 illustrates a manner of calculating a model of a venue having a straight rake, according to an exemplary embodiment of the present invention. In FIG. 5, the angle between the main floor of the building and the floor holding the seats is denoted as α. This is the rake angle. A general goal of raking is to provide line of sight between any row and a "source" at center stage. Resultantly, the angle α is dependent on the difference in height, Δh, of the last two rows, the distance b between that row and the source, the distance d between rows, the distance a between the stage and the first row, and the difference between the height of the first row and the height of the source. The equation for alpha can be rearranged to solve for the difference in heights, Δh, as follows:

$$\Delta h = \frac{d}{b} \times (e + a \times \tan\alpha).$$

Thus, the height of each row within a seat section may be calculated iteratively, by starting at the front of the section and moving backward.

Figure 6:
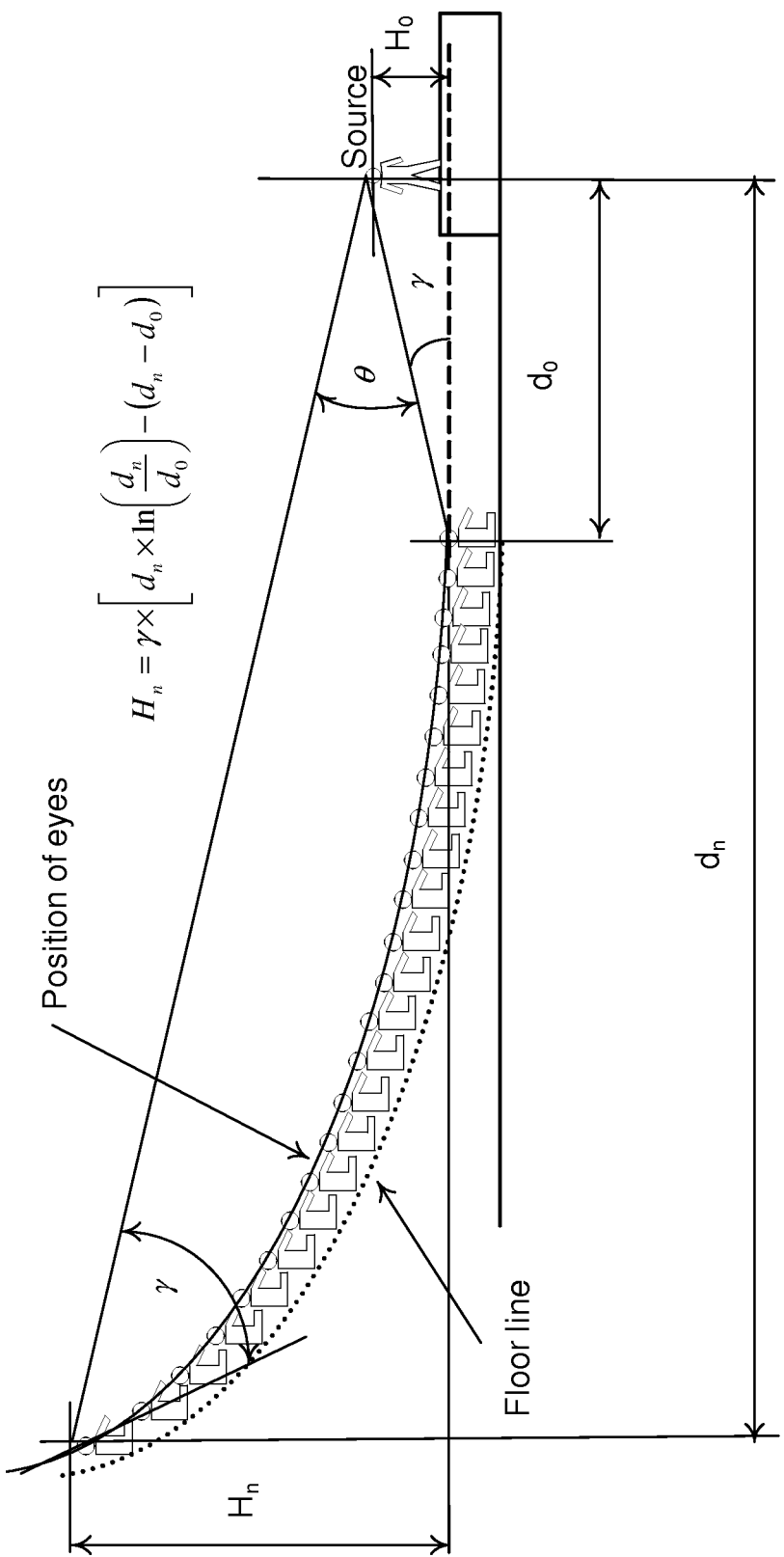
FIG. 6 illustrates parameters for calculating a model of a venue having a curved rake, according to an exemplary embodiment of the present invention.

FIG. 6 illustrates a manner of calculating a model of a venue having a curved rake, according to an exemplary embodiment of the present invention. A curved rake will generally follow a curve of decreasing radius, to yield a constant viewing angle for each row. This results in a complicated equation having a solution commonly referred to as "logarithmic spiral." The elements of the problem are defined as follows:

The height of any row, $H_n$, can be expressed in terms of the angle γ between the line of sight of a viewer in the first row to the source and the horizontal line at the height of the viewer. The distance $d_n$ is the distance from the source to the nth row. The distance $d_0$ is the distance to the viewer in the first row. Once again, one may iteratively solve for the height of any row, using the inputs to satisfy the following equation:

$$H_n = \gamma \times \left[ d_n \times \ln\left(\frac{d_n}{d_0}\right) - (d_n - d_0) \right].$$

Within a venue model, rows may be created by calculating each set of seats from the center of the theatre and placing seats outward according to the rules defined for rows in the venue information. For example, a row with an odd number of seats have its center seat placed on the centerline, while a row with an even number of seats may have the two center seats spanning the centerline. Seats may be placed progressively outward, with each seat on a side of the centreline being duplicated and reflecting across a mirror of the centerline.

A determination of the distance between each row may be made by applying one of several models governing the shape of the curve that the rows will follow. The model used to describe the shape of the rows may determine the actual placement of each seat. An exemplary model may be based on ellipsis calculations.

A virtual ellipsis may be placed with its center at center stage, or at the center of the rear wall of the stage, and the size of the ellipsis may be defined based on the width of the stage. An ellipse is generally defined in terms of a semi-major, a semi-minor axes, and one or two foci. The foci of the ellipse may be placed at the width of the stage opening. Alternatively, to achieve a different row shape, the width of the semi-major axes may be set to one half the width of the stage. As will be understood, a circle may also be used in modelling, as a circle is a special case of an ellipse, in which the semi-major and semi-minor axes are equal.

An initial ellipse may be defined using the stage parameters, and then symmetrical ellipses at each row may be found using the eccentricity and the distance to the stage at that row as the semi-minor axis. After the position of a seat is determined, the angle of the seat may be calculated by finding the angle that the front of the seat makes with the tangent line on the ellipse at the point where the seat is located.

Using the above or other calculations, charting unit 140 can thus provide relatively accurate venue models and seating charts.

D. SEARCH UNIT

Search unit 150 provides robust searching functionality for ticketing system 100. For example, search unit 150 can receive one or more parameters from a user, and based on the parameters, search unit 150 can identify seats or events of potential interest to the user. For instance, search unit 150 can provide searching by price, searching across multiple performances of a single event, or searching across multiple events, based on the provided parameters. When search results are returned, they may include a seating chart in find tickets mode, thus enabling a level of interactivity appropriate for selecting seats for purchase.

As discussed above, ticketing system 100 can be associated with a list of events, each event being associated with at least one event venue. A user may provide one or more parameters for selecting at least one event from the set of events handled through ticketing system 100. For instance, the parameters may specify a unique performance, e.g., a specific time and date of an event, or they may indicate an entire event or performances of an event within a predetermined timeframe. Ticketing system 100 receives the user-provided parameters through website 150, enabling the user to search or browse the events associated with ticketing system 100.

Standard parameters for finding tickets may include the dates a user wants to attend an event, along with seating preferences, but other parameters may alternatively be used.

In some embodiments, search unit 150 may enable searching across multiple performances or events. In that case, the search results may be returned in an organized manner, separated by distinct performances or events. For example, a search results web page may comprise two or more tabs, each tab being associated with a single performance or event of the search results. A single tab may be active upon initial return of the search results, and a seating chart for the corresponding performance or event may be displayed. The user may activate one of the tabs by performing a mouse action on the desired tab, thus making that tab active and causing website 115 to display the seating chart for the corresponding performance or event.

In certain preferred embodiments, after the user enters the search parameters, ticketing system 100 provides the best available tickets according to a predetermined formula for determining what constitutes "best." Ticketing system 100 may also provide one or more alternative ticket options based on the search parameters. In some embodiments, ticketing system 100 may include a free-for-all mode, in which ticketing system 100 may expose the whole seat inventory for a selected performance, with or without specific "best" recommendations. In this mode, the user may pick his seats without limitation except ticket availability.

Figure 3:
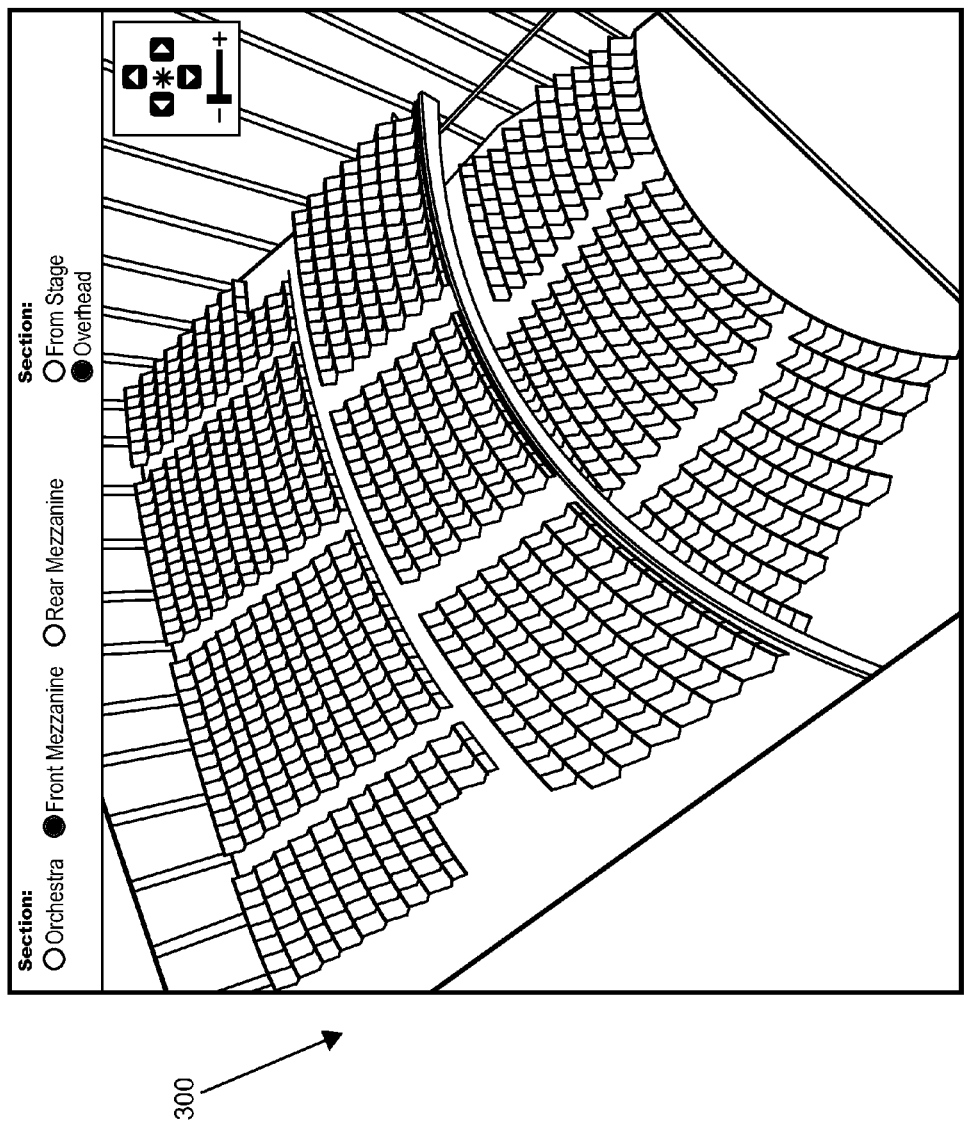
FIG. 3 illustrates a three-dimensional representation of a seating chart, according to an embodiment of the present invention.
Figure 4A:
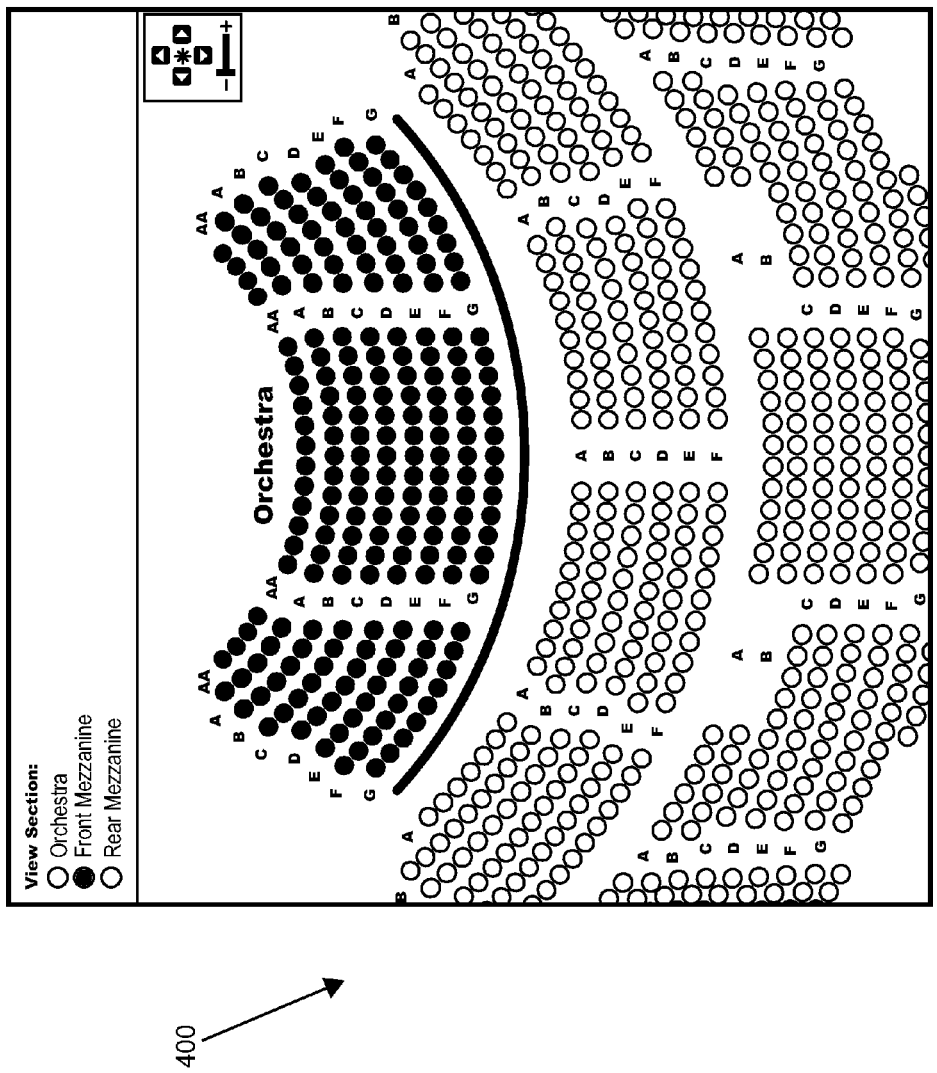
FIGS. 4A-4B illustrate two-dimensional representations of seating charts, according to an embodiment of the present invention.
Figure 4B:
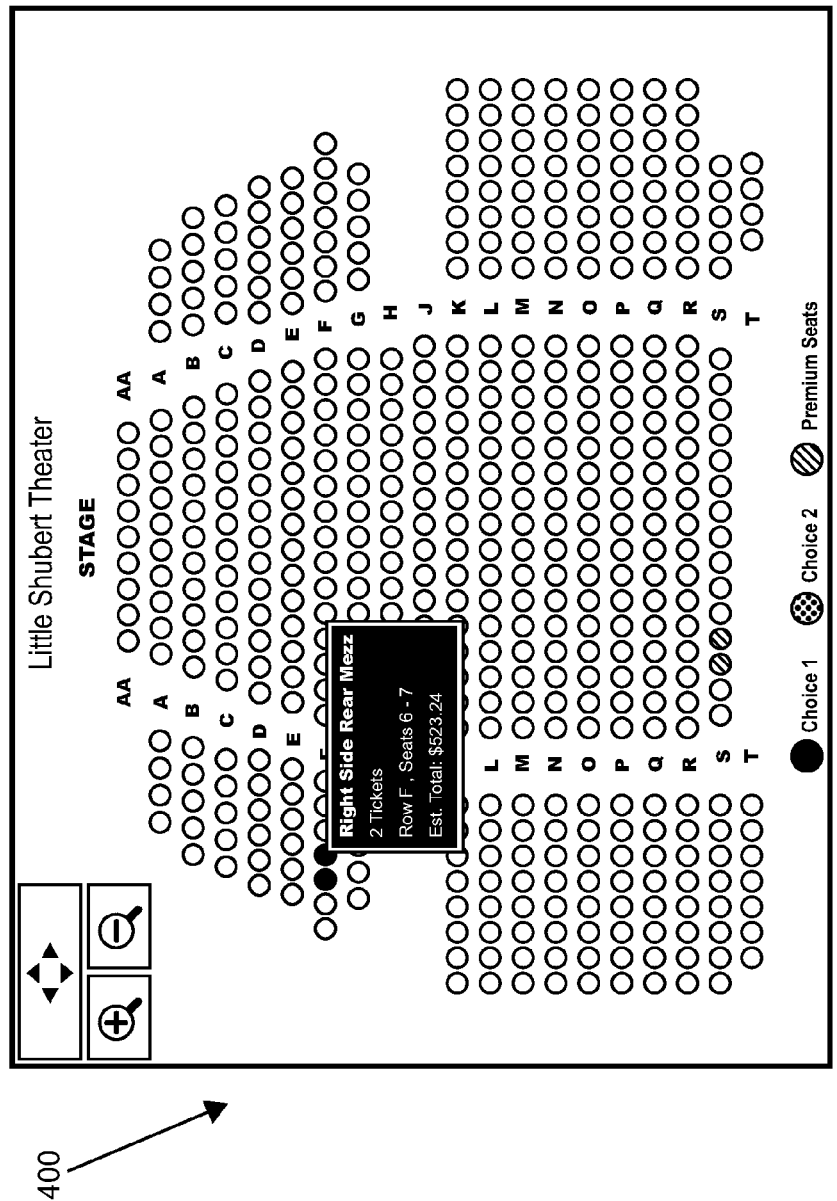

The result of a search may be a displayed seating chart. For example, FIG. 3 illustrates a three-dimensional seating chart 300, and FIGS. 4A-4B illustrate two-dimensional seating charts 400, according to an exemplary embodiment of the present invention. As shown in FIG. 4B, the seats may be color-coded after a search is performed. Although the figures show color-coding only for a two-dimensional chart, this coding may be extended to three-dimensional charts as well.

In a seating chart, a first color may be used to indicate recommended "best" seats, which may be chosen based on various factors, including proximity to the center of the performance space, proximity to the stage, or view obstructions. After the user selects one or more seats, which may or may not be the "best" seats that were auto-selected, a second color may be used to indicate the seats selected. In some embodiments, the selected seats may be placed on hold to prevent other users from selecting or purchasing them after the user makes the selection, regardless of whether the selection was made by the ticketing system 100 or manually by the user. In some alternate embodiments, however, manually selected seats are not held for the user until the purchase process begins. In these alternate embodiment, auto-selected "best" seats may still be held for the user on a temporary basis.

If the user is viewing multiple performances, such as in tabbed search results, then in some embodiments, only the selected seats in the current tab remain on hold for the user. The selected seats may appear as unavailable to other users until the seats are released, if at all. In other embodiments, however, no seats are held for the user until the user specifically indicates which seats he or she is considering for purchase. A third color may be used to indicate the remaining available seats, which may exclude seats for which tickets have already been purchased and seats on hold by other users.

That is to say ticketing system 100 can enable the user to interact with the seating chart in various manners, which manners may be dependent on which representation (e.g., two-dimensional or three-dimensional) of the seating chart is provided. When the user selects, such as with a mouse click, a particular section or seat in the seating chart, ticketing system 100 may provide information about the section or seats selected. For example, ticketing system 100 may provide a price range or availability status. If the selection covers a seating section, ticketing system 100 may provide information about how many seats are available and how many are unavailable, as well as a price range or average price for the available seats.

As discussed above, the user may select seats, which may be achieved by the user's clicking on the desired seats with a mouse or otherwise interacting with the seating chart at the location of the seats. The seating chart may be moveable or rotatable, enabling the user to view seats at multiple angles. For example, the user may zoom-in, zoom-out, pan the viewport, change views, or hide and show various levels or sections of the seating chart. In some embodiments, the seating chart may be configured to provide a view of the stage or other focal point of a venue from a set of seats in question.

Thus, using seating charts and search unit 150, ticketing system 100 may provide a user-friendly interface enabling users to efficiently select and purchase seats.

E. TRANSACTION UNIT

Transaction unit 160 facilitates financial transactions related to ticketing system 100. After seats are selected by a user, transaction unit 160 may provide a shopping cart and various forms for the user to fill out to provide payment. During the checkout process, the user's seats may remain on hold and may therefore appear as unavailable to other users concurrently accessing ticketing system 100.

When a user places one or more seats on hold, for example, when performing a transaction to purchase tickets for those seats, ticketing system 100 may associate the held seats with a session identifier associated with the user's client instrumentality 120. Each session identifier may be unique to client instrumentality 120. Thus, another user currently using ticketing system 100 from a second client instrumentality 120 may be unable to select those same seats for purchase until the hold has been removed. When the hold is released, the association between the seats and the previously-holding user's client instrumentality 120 may be removed, thus placing the seats back into the pool of available seats.

Transaction unit 160 may accept various forms of payment, including, for example, credit card or electronic check. In some embodiments, transaction unit 160 may communication with a third-party financial institution to verify payment. After payment is received, transaction unit 160 may transmit confirmation to the user and the purchased seats may be removed from inventory.

F. CONCLUSION

While ticketing system 100 has been disclosed in various specific forms, it will be apparent to those skilled in the art that many modifications, additions, and deletions can be made without departing from the spirit and scope of the system, method, computer product program, and their respective equivalents, as set forth in the following claims.

What is claimed is:

1. A system comprising:
    at least one memory operatively coupled to at least one processor and configured to store data and instructions that, when executed by the at least one processor, cause the system to perform a method comprising:
        receiving geometry data related to a physical layout of a venue hosting one or more performances;
        receiving seating data related to seat availability for a performance hosted by the venue;
        generating, by the processor, dynamically in response to receiving a request from a user for at least one of a seating chart and seating availability for the performance, a three-dimensional model of the physical layout of the venue, wherein generating the three-dimensional model comprises the steps of:
            using a first subset of the geometry data including rake, distance between the rows, and curvature of the rows to generate a computer-generated depiction of a plurality of physical seats in a plurality of rows within the venue, wherein locations of the plurality of seats are based on the first subset of the geometry data,
            using a second subset of the geometry data including stage height, width, and depth to generate a computer-generated depiction of a stage, wherein the size and shape of the stage are based on the second subset of the geometry data, and
            using a third subset of the geometry data including distances from the seats to the physical structures to generate a computer-generated depiction of one or more physical structures of the venue, wherein the depiction of the physical structures is based on the third subset of the geometry data;
        generating, by the processor, an interactive seating chart comprising the three-dimensional model and visually indicating an availability of a plurality of seats, wherein the availability is based on inventory data that is dynamically updated in real time based on changes in seat availability from at least one of purchases and reservations;
        sending, to the user over a computer network, the generated seating chart;
        outputting, for display, a first view of the seating chart, including available seats;
        generating, by the processor, dynamically in response to receiving a request from a user for a view of the stage from a selected available seat, a computer-generated view of the stage from the selected seat, wherein the view is based on the geometry data;
        sending, to the user over a computer network, the generated view of the stage from the selected seat; and
        outputting for display, the view of the stage from the selected seat.

2. The system of claim 1, further comprising determining the locations of the plurality of seats using an ellipsis-based algorithm.

3. The system of claim 1, the seating chart being manipulable to enable a user to view a selected seat from a plurality of angles.

4. The system of claim 1, the method further comprising determining, based on the one or more physical structures obstructing a line of sight to the stage, recommended seats for the performance.

5. The system of claim 4, the method further comprising visually indicating the recommended seats on the seating chart.

6. The system of claim 5, wherein the recommended seats are indicated by color.

7. The system of claim 1, wherein the one or more physical structures obstruct a line of sight to the stage from the one or more seats.

8. The system of claim 1, wherein generating the three-dimensional model of the physical layout of the venue further includes performing an ellipsis calculation to determine the curvature of the rows.

9. The system of claim 8, wherein the ellipsis calculation comprises one or more of:
   calculating an ellipsis having a center at the center of the stage;
   placing a virtual ellipsis with the center of the ellipsis at a rear wall of the stage;
   calculating an ellipsis having foci placed at an opening of the stage;
   calculating an ellipsis with the width of semi-major axes of the ellipsis set to one half the width of the stage; and
   calculating an initial ellipse based on physical parameters of the stage and calculating symmetrical ellipses at each row of the plurality of rows using the eccentricity and distance to the stage from each respective row.

10. The system of claim 1, wherein the geometry data related to the physical layout of the venue comprises one or more of: distance between rows, aisle width, seat width, height of one level of the venue above another level of the venue, floor rake, railing height, data associated with an overhang row, width of the stage, and depth of the stage.

11. The system of claim 1, the method further comprising:
   responsive to a purchase by the user of one or more of the available seats,
   providing, to the user, one or more tickets for one or more corresponding physical seats at the venue for the performance.

12. The system of claim 1, comprising:
   a venue information database configured to store the physical measurements of the venue from the geometry data; and
   a charting unit separate from the venue information database and which, when implemented by the at least one processor, generates the three-dimensional model of the physical layout of the venue dynamically in response to the request from the user.

13. A method comprising:
   receiving geometry data related to a physical layout of a venue hosting one or more performances;
   receiving seating data related to seat availability for the one or more performances hosted by the venue; and
   responsive to receiving, from a user, a search request comprising one or more seating preferences:
      determining, based on the seating data, one or more seats available for a performance, and
      generating, by a computer processor, dynamically in response to the search request, a three-dimensional model of the physical layout of the venue, wherein generating the three-dimensional model comprises using a subset of the geometry data including rake, distance between the rows, and curvature of the rows to generate a computer-generated depiction of a plurality of physical seats in a plurality of rows, wherein locations of the plurality of seats are based on the subset of the geometry data;
   generating, by the processor, an interactive seating chart based on the geometry data, the seating chart comprising the three-dimensional model of the venue and visually indicating an availability of a plurality of seats, wherein the availability is based on inventory data that is dynamically updated in real time based on changes in seat availability from at least one of purchases and reservations;
   highlighting at least a portion of the one or more seats available for the performance on the seating chart;
   sending, to the user over a computer network, the generated seating chart;
   outputting, for display, a first view of the seating chart, including available seats;
   generating, by the processor, dynamically in response to receiving a request from a user for a view of the stage from a selected available seat, a computer-generated rendering of a view of the stage from the selected seat, wherein the rendering is based on the geometry data;
   sending, to the user over a computer network, the generated rendering of the view of the stage from the selected seat; and
   outputting, for display, the view of the stage from the selected seat.

14. The method of claim 13, wherein the performance is a part of a plurality of performances at the venue, the method further comprising, responsive to receiving the search request:
   generating another seating chart related to another performance of the plurality of performances;
   and outputting, to a display, a second view of the other seating chart.

15. The system of claim 14, wherein the seating chart is displayed in a first tab of a web page and the other seating chart is displayed in a second tab of the web page.

16. The method of claim 13, further comprising receiving a purchase request to purchase one or more seats; and
   responsive to the purchase request, initiating a checkout process wherein the seating data is temporarily updated, pending payment for the one or more seats, to reflect that the one or more seats are unavailable.

17. The method of claim 16, further comprising automatically transmitting a communication to a user In response to receiving an update related to the saved one or more seats.

18. The method of claim 16, further comprising, responsive to receiving the payment for the one or more seats, updating the seating data to reflect that the one or more seats are permanently unavailable.

19. The method of claim 16, further comprising, responsive to the check out process being canceled, updating the seating data to reflect that the one or more seats are again available.

20. The method of claim 13, the seating chart comprising a depiction of a focal point of the venue, wherein a shape and location of the focal point are based on one or more measurements in the geometry data.

21. The method of claim 20, further comprising generating, by the computer processor, a view of the focal point from a selected seat in the venue based on one or more measurements in the geometry data.

22. The method of claim 13, further comprising determining the locations of the plurality of seats using an ellipsis-based algorithm.

23. The method of claim 13, further comprising determining the locations of the plurality of seats based on a type of rake used in the physical layout of the venue.

24. The method of claim 13, further comprising:
   receiving an indication of a user input corresponding to a rotation instruction; and
   rotating the view of the seating chart being output for display, in response to the rotation instruction.

25. The method of claim 13, wherein the search request is received over a computer network from a client computing device, and wherein the seating chart is output over the computer network for display at the client computing device.

26. A computer program product embodied in one or more non-transitory computer-readable media having computer-readable instructions stored thereon for execution by a processor to perform a method comprising:

receiving geometry data related to a physical layout of a venue hosting a performance;

receiving seating data related to seat availability for the performance;

generating, by the processor, dynamically in response to receiving a request to view seating for the performance and based on the geometry data and seating data, a three-dimensional model of the physical layout of the venue, wherein generating the three-dimensional model comprises using a subset of the geometry data including rake, distance between the rows, and curvature of the rows to generate a computer-generated depiction of a plurality of seats in a plurality of rows, wherein locations of the plurality of seats are based on the subset of the geometry data;

generating, by the processor, an interactive seating chart for the performance, the seating chart comprising the three-dimensional model of the physical layout of the venue, wherein an availability of the plurality of seats is visually indicated in the seating chart, and wherein the availability is based upon changes in seat availability from at least one of seat purchases and seat reservations;

responsive to receiving the request to view seating, outputting, for display, a first view of the seating chart including available seats;

responsive to receiving a request associated with a first user account to bookmark one or more seats represented in the seating chart, storing, in a memory, an association between the one or more seats and the first user account; and responsive to receiving, by the processor, updated data related to at least one of a status of the performance and a status of the one or more seats, sending automatically, over a computer network and based on the association between the one or more seats and the first user account, an indication of at least one of the status of the performance and the status of the one or more seats to a computing device associated with the first user account.

27. The computer program product of claim 26, the method further comprising dynamically determining a second view of the seating chart based on the geometry data, responsive to receiving an indication of a user interaction with the seating chart.

28. The computer program product of claim 26, wherein the updated data related to the status of the one or more seats reflects a change in availability of the one or more seats.

29. The computer program product of claim 26, wherein the updated data related to the status of the one or more seats reflects a change in price of the one or more seats.

30. The computer program product of claim 26, wherein the updated data related to the status of the one or more seats reflects a change in location of the one or more seats.

* * * * *